May 28, 1940.  L. A. ANDIA  2,202,750

MEANS FOR MANUFACTURING RUBBER SOLED FOOTWEAR

Filed July 16, 1938

Inventor,
L. Adot Andia
By: Glascock Downing & Seebold
Attorneys.

Patented May 28, 1940

2,202,750

UNITED STATES PATENT OFFICE 2,202,750

MEANS FOR MANUFACTURING RUBBER SOLED FOOTWEAR

Laurencio Adot Andia, Boston, Mass., assignor to Compania Industrial Del Caucho, Sociedad Anónima Comercial é Industrial, Buenos Aires, Argentine Application July 16, 1938, Serial No. 219,657

3 Claims. (Cl. 18—45)

This invention has reference generally to improvements in that class of inventions known as boots and shoes and more particularly relates to a method and means for manufacturing rubber soled footwear.

Heretofore various methods have been employed for joining the upper of the shoe which is generally made of canvas to the rubber sole but these methods have presented disadvantages due to various reasons such as the high cost of manufacture and the staining of the upper during vulcanization and it is the object of this invention to overcome these disadvantages in providing a method and means for manufacturing rubber soled footwear primarily employing a sectional last, at least one of the inner parts or sections of which is composed of a yielding or elastic material and constructed so that when pressure is applied it will coact with the upper to seal the mold near the bottom thereof without the employment of separate sealing means.

More particularly the invention consists in the employment of a sectional last the outer part of which is solid while at least one inner part is elastic, said last being inserted within an upper and placed within a mold above the rubber sole and subsequently applying pressure and heat whereby the yieldable or elastic part is expanded laterally to press the upper against the inner wall of the mold near the bottom thereof at a point immediately above the uncured outer sole, the heat inherent to the vulcanizing action being utilized to effect the direct vulcanization of the sole to the inturned part of the upper which incidentally is moved or extended laterally in the mold on the application of pressure the result being a clean connection of the sole to the upper without even employing a bonding means or utilizing any separate means for preventing the spreading of the uncured material upwardly in the mold and along the upper outer surface of the upper.

Other objects as well as the nature, characteristic features and scope of the invention will be more readily apparent from the following description taken in connection with the drawing and pointed out in the claims forming a part of this application.

The invention is clearly illustrated in the accompanying drawing, in which—

Figure 1:
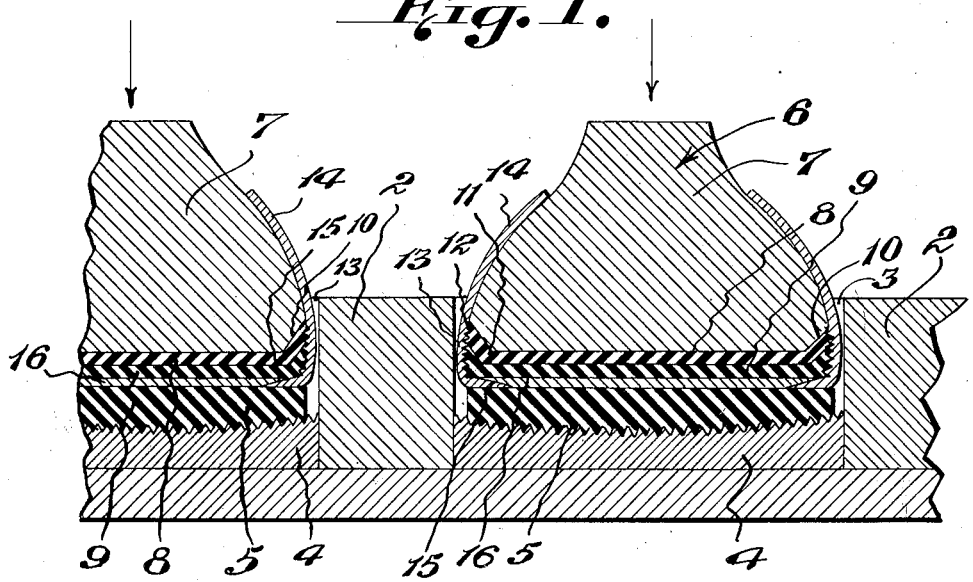
Fig. 1 is a vertical transverse sectional view through a multiple mold.

Referring now, more particularly, to the accompanying drawing in which similar reference characters are employed to designate corresponding parts there is provided a mold including a main supporting plate 1 on which is disposed an apertured plate 2, the apertures 3 of which there are several, being shaped to conform to a shoe or foot while arranged within each aperture and positioned at the bottom thereof is an imprinting plate 4 which together with the walls of the aperture form a mold. Positioned within each mold is an uncured sole 5 of rubber.

In carrying out the invention there is employed a sectional last generally designated 6 including a solid outer part 7 of hard rubber or metal and superposed inner sections 8 and 9 of yielding material such as elastic, said sections having if desired varying degrees of elasticity. The lower edge of the solid part 7 is preferably beveled as at 10 while the outer edges of the yielding or elastic sections 8 and 9 are flanged slightly upwardly as at 11 and 12, said flanged portions being arranged in nesting relation with each other and in contact with the beveled edge 10 of the solid portion as indicated in the drawing while the free outer edges of the flanged portions are provided with teeth 13 for a purpose that will hereinafter appear.

There are of course several lasts of this nature one for cooperating with each of the molds herein mentioned.

Each last is inserted within an upper 14 which may be formed of canvas or other suitable material and with the lowermost elastic section 9 contacting the upper surface of the inturned portion 15 of the upper and the inner sole 16, the last and the upper being inserted within the adjacent mold in such manner that the outer surface of the inturned portion 15 and the inner sole contacts the upper surface of the uncured sole 5. In this connection attention is respectfully directed to the fact that whereas there is a close fit between the plate 4 and the walls 3 there is if desired a space between the outer edges of the sole 5 and the said walls 3 and when pressure is applied to each last the teeth on the flanged portions impinge against the inner surface of the upper and continued application of the pressure causes the sections 8 and 9 to be expanded laterally and moves the outer surface of the upper part laterally to impinge and hermetically seal and close against the wall of the mold at a point in close proximity to the adjacent plate 4. Simultaneously with this action, the parts being in proper position in a hydraulic vulcanizing mold, the uncured sole is immediately vulcanized directly to the under surface of the inner sole and the inturned portions while the sealing engagement described prevents material from the uncured rubber sole rising above the position shown in the drawing thereby ensuring of a clean upper without the employment of separate means for preventing the material rising in the mold.

Although no hydraulic vulcanizing press is shown it is to be appreciated that the main supporting plate 1 is supported by one part of the press and pressure is applied to the upper surfaces of the sectional lasts by the other part of the press.

Figure 2:
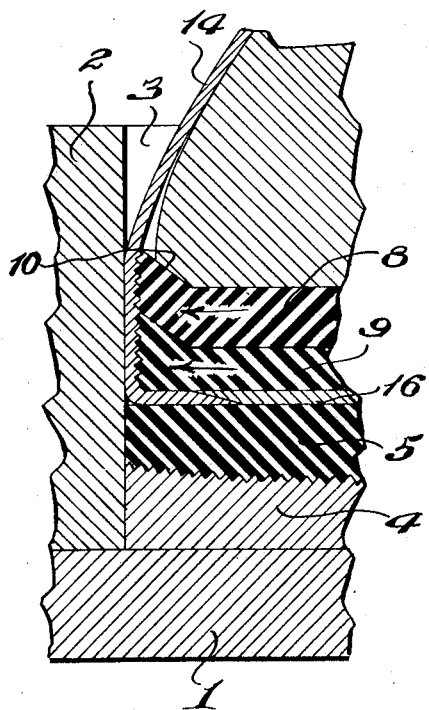
Fig. 2 is an enlarged transverse sectional detail showing the position of the parts assumed when pressure is applied and during vulcanization.

Attention is respectfully directed to the comparative showing in Figures 1 and 2. In Figure 1 the space between the sole 5 and the mold is closed or filled in Figure 2 due to the application of the pressure and the heat. Incidentally Figure 2 illustrates the positions assumed by the inturned part of the lining and the elastic sections 8 and 9 owing to the application of pressure and it is because of the provision of the elastic last that applicant is enabled to effect the lateral movement of the upper into sealing engagement immediately above the uncured sole 5.

Another advantage incident to the use of this method and means is the fact that after vulcanization the last and upper with the sole attached may be readily removed from each mold. Obviously the last may be readily removed from the upper and in this connection it is to be observed that if desired the sections of the last may be separately made and inserted or assembled together and inserted as a unit within the upper.

Figure 3:
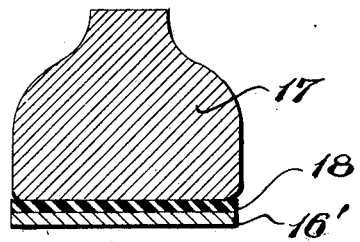
Fig. 3 is a transverse sectional view of a modified form of last.

In the modification shown in Figure 3 the lowermost section 16' of the last instead of being constructed of rubber is made of the same material as the top section 17 while the intermediate section 18 is made of elastic material and is adapted to be expanded laterally when in use.

Figure 4:
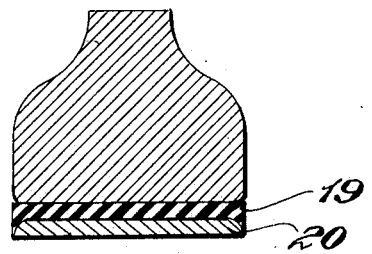
Fig. 4 is a similar view of a further modified form of last.

In Figure 4 the modification is somewhat the same as in Figure 3 with the exception that the intermediate elastic section 19 is formed with a downwardly extending flange 20 as indicated.

It is believed in view of the foregoing that a further detailed description of the operation of the invention is entirely unnecessary. Likewise it is believed that the advantages of the invention will be fully apparent.

Having thus fully described the invention what is claimed as new and desired to be secured by Letters Patent is:

1. Means for manufacturing rubber soled footwear, comprising in combination an open topped mold for receiving an uncured sole, an upper carrying sectional last arranged within the mold and including a solid outer part the lower outer edge of which is beveled and at least one elastic inner part the lower outer edge of which is flanged upwardly and arranged in nesting relation with the beveled edge of the solid part, and the last being positioned completely within the mold and adapted to be expanded laterally when under pressure, whereby to seal the upper carried therewith against the wall of the mold at a point near the bottom thereof.

2. Means as claimed in claim 1, in which the free outer edge of the elastic inner part is provided with teeth.

3. Means for manufacturing rubber soled footwear, comprising in combination an open topped mold for receiving an uncured sole, an upper carrying sectional last including a solid outer part and at least one elastic inner part, the outer edge of which is flanged and arranged about the adjacent edge of the solid part and provided with teeth and the last being positioned completely within the mold and adapted to be expanded laterally when under pressure thereby to seal the upper carried therewith against the wall of the mold at a point near the bottom thereof.

LAURENCIO ADOT ANDIA.